United States Patent Office 3,767,720
Patented Oct. 23, 1973

3,767,720
SELECTIVE HYDROGENATION OF AROMATIC HYDROCARBONS TO CYCLOOLEFINS
William Charles Drinkard, Jr., Orange, Tex., assignor to E. I. du Pont de Nemours and Company, Wilmington, Del.
No Drawing. Continuation-in-part of abandoned application Ser. No. 138,801, Apr. 29, 1971. This application Feb. 25, 1972, Ser. No. 229,565
Int. Cl. C07c 5/10
U.S. Cl. 260—667    14 Claims

ABSTRACT OF THE DISCLOSURE

A process is provided for the preparation of a cycloolefin which comprises the partial hydrogenation of an aromatic hydrocarbon in an aqueous alkaline solution in the presence of a reduced catalyst formed from a compound of a Group VIII metal. The hydrogenation can be carried out by adding to the catalyst system a cation such as that provided by zinc chloride or chromous chloride or a carbonyl of chromium, molybdenum or tungsten or both the cation and the carbonyl.

CROSS-REFERENCE TO RELATED APPLICATION

This application is a continuation-in-part of U.S. patent applcation Ser. No. 138,801, now abandoned, filed Apr. 29, 1971 by William Charles Drinkard, Jr.

BACKGROUND OF THE INVENTION

The invention relates to the preparation of cycloolefins and more particularly to the preparation of cyclohexene. Hitherto a cycloolefin such as cyclohexene has been obtained by dehydration of cyclohexanol or by dehydrohalogenation of chlorocyclohexane. It is well known that preparation of a cycloolefin by partial reduction of a non-condensed aromatic ring is difficult to accomplish, in that the resulting olefin or diolefin is usually more easily reduced than the original aromatic compound. However, a process has been described in U.S. Pat. 3,391,206 for preparation of cyclohexene by partially hydrogenating benzene in the presence of a lower alcohol as a solvent and a ruthenium catalyst. Also, preparation of a tetrahydrophthalic acid by partial hydrogenation of the monoalkali salt of the corresponding phthalic acid in the presence of a ruthenium catalyst has been described in U.S. Pat. 3,162,679.

Improved methods for preparing cycloolefins continue to be sought. Methods which would be based on low cost starting materials such as benzene, toluene or the xylenes and wherein the cycloolefin would be prepared in an aqueous system providing easy isolation of the reduction products are especially desirable.

STATEMENT OF INVENTION

It has been discovered that cycloolefins can be prepared by partial hydrogenation of the corresponding aromatic compound in the presence of water, an alkaline agent and a catalyst comprising a reduced cation of a Group VIII element.

The hydrogenations can be carried out at atmospheric pressure or at pressures below or above atmospheric, in the range, for example, of about 0.01 to about 500 atmospheres. The reaction can be carried out batch-wise or continuously, in the liquid phase or in vapor phase, and at temperatures in the range of about 0° C. to about 250° C.

The catalyst compositions comprise reduced cations of the Group VIII elements of the Periodic Chart, namely, iron, cobalt, nickel, ruthenium, rhodium, palladium, osmium, iridium and platinum or mixtures thereof.

The reducing agents are those which are more electropositive than the Group VIII element and include such metals as zinc, aluminum, magnesium, lithium, sodium, potassium, rubidium, calcium, strontium, barium and thorium and such compounds as titanium trichloride, sodium borohydride, chromous chloride or ferrous chloride. Depending on the particular Group VIII element to be reduced, hydrogen may also be used.

The term "alkaline agent" is intended to mean one which in water gives an aqueous solution having a pH value greater than 7.5. Alkalinity may be supplied by alkaline agents which include the hydroxides and oxides of the alkali metals lithium, sodium, potassium, rubidium and cesium, of the alkaline earth metals calcium, strontium and barium as well as ammonia and water soluble organic bases such as methylamine, dimethylamine, diethylamine, tripropylamine, alkylene diamines such as ethylene or propylene diamine, pyridine and the quaternary ammonium bases. The alkaline agent may be used individually or if desired a mixture of two or more individual alkaline agents may be employed in a given hydrogenation. As will be discussed below, the hydrogenation can be carried out with the catalyst on a support. In the case wherein the support is itself basic, alkalinity for the hydrogenation may be provided at least partially by the basic support. In general, alkalinity will be provided by the added alkaline agent.

The hydrogenation can be carride out by introducing into the reactor in addition to the catalyst system and the aqueous alkaline solution a cation of the group consisting of $Zn^{++}$, $Cr^{++}$, $Hg^+$, $Hg^{++}$, $Ni^{++}$, $Mo^{++}$, $Fe^{++}$, $Fe^{+++}$, $Co^{++}$ and $Cu^+$ in an amount from about 0.01 to about 1.0 mole percent, based on the molar amount of the catalyst compound added to the reactor. Suitable compounds of this type include the chlorides, bromides and sulfates of the above-mentioned cations.

The hydrogenation can also be carried out in the added presence of a carbonyl of chromium, molybdenum or tungsten, in an amount from about 0.01 to about 1.0 mole percent based on the molar amount of the aromatic compound being hydrogenated. Alternately the hydrogenation can be carried out using both a cation as mentioned above and a carbonyl or a mixture of cations or carbonyl or mixed cations and mixed carbonyls.

The aromatic compound to be partially hydrogenated can be a monocyclic aromatic hydrocarbon or substituted monocyclic aromatic hydrocarbon of the general formula $C_6H_{6-n}A_n$ wherein A is at least one radical of the group of hydrogen, halogen,

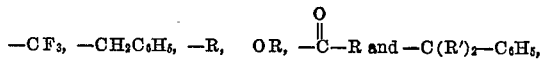

where R is a phenyl or alkyl group having one to six carbon atoms, n is an integer of 1–3 and R' is an alkyl group of one to four carbon atoms.

Typical monocyclic aromatic hydrocarbons include benzene, toluene, ortho-, meta- and para-xylene. Typical substituted monocyclic aromatic hydrocarbons include alkoxy- and phenoxy-substituted hydrocarbons such as anisole, phenetole and diphenyl ether, such compounds as acetophenone benzophenone, diphenylmethane, fluorobenzene, chlorobenzene, bromobenzene, dichlorobenzene, dibromobenzene as well as benzene substituted with at least two different halogen atoms, with —CF₃ or with aralkyl groups such as —C(CH₃)₂C₆H₅,

—C(C₂H₅)₂C₆H₅,

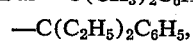 or —(n-C₄H₉)₂C₆H₅.

The hydrogenations are carried out in any suitable apparatus and can be done batch wise or continuously. By one process a salt of the catalyst metal is charged into the reactor, the reactor is flushed with an inert gas such as nitrogen, a portion of the water is added to dissolve the salt after which or along with which the reducing agent is introduced either as a solid or as an aqueous solution. Following the reduction of the catalyst metal compound the alkaline agent is added either as solid or solution and hydrogen flow is then started. The catalyst compound can also be reduced in a separate operation and introduced into the reactor through a dropping funnel or other appropriate device. The aromatice compound to be hydrogenated can be introduced into the reactor along with the other reactants or separately prior to start of the hydrogen flow. At the desired interruption point the reaction product can be separated from the catalyst system by decantation and further refined by distillation.

As indicated above, the catalyst can be used in the hydrogenation as a fixed bed or fluidized system such as a slurry or gaseous dispersion. Typical supports for fixed bed systems include molecular sieves, MgO, $Mg(OH)_2$, $MgCO_3$, $Ca(OH)_2$, $CaCO_3$, $BaCO_3$, $MnCO_3$, $NiCO_3$, $CoCO_3$, ZnO, $TiO_2$, $Al_2O_3$ and talc. The support can be basic, acidic or neutral. Especially favorable results are obtained with the catalyst on a support which is basic wherein, as methode above, the alkalinity is supplied at least partially by the support.

The partially hydrogenated products such as cyclohexene are useful as intermediates in commercially important processes such as conversion into cyclohexanol or adipic acid.

DESCRIPTION OF PREFERRED EMBODIMENTS

In the preferred embodiments of this invention the reduced catalyst compositions are derived from ruthenium, rhodium and palladium compounds such as $RuCl_3$, $RhCl_3$ or $PdCl_2$, or their hydrates. Especially preferred are the reduced catalyst compositions derived from ruthenium.

It is preferred that the water/alkaline agent system be in the fom of an aqueous solution having a pH of at least 11.0; the preferred alkaline agents are the hydroxides of the alkali metals such as LiOH, NaOH and KOH.

The preferred reducing agents are $TiCl_3$, $CrCl_2$, $NaBH_4$, zinc and hydrogen. The hydrogenations are preferably carried out at a temperature in the range of 25° C. to 200° C. and at a hydrogen pressure of one to about 100 atmospheres. Preferred aromatic compounds for the partial hydrogenation are benzene, toluene and the xylenes.

The preferred range of optionally added cation used with the catalyst system is from about 0.03 to about 0.15 mole percent based on molar amount of the catalyst metal. Preferred compounds for this purpose are the chlorides of the cations as mentioned. The preferred amount of carbonyl for use with the catalyst system if from about 0.03 to about 0.15 mole percent based on molar amount of compound being hydrogenated. Best conversions and yields of the desired cycloolefins are realized with use of both the cation and the carbonyl with the catalyst system.

SECTION A

Hydrogenation with aqueous alkaline solution and Group VIII metal catalyst

In Examples 1 to 27 the hydrogenations are run in a reaction vessel fitted with stirrer, a side arm for supplying hydrogen below the liquid surface, a gas exit fitted with a bubbler tube to prevent entry of air, a side arm fitted with a serum cap for introduction of liquids by syringe and a large bore dropping funnel for introduction of solids. The stirrer blades and baffle are coated with Teflon® polytetrafluoroethylene resin. In each example the salt of the catalyst metal is charged to the vessel, the vessel is sealed and sparged with nitrogen after which a portion of the water is added to dissolve the salt following which the reducing agent is added. Base is then added either as solid by quickly opening the system with nitrogen sparge or by adding a solution of base in water through the serum cap. The compound to be reduced is added with the catalyst ingredients or after the base is added prior to starting the hydrogen flow. The crude organic layer is separated from the water layer containing residual catalyst and is analyzed by gas chromatography on an F. & M. Model 700 Gas chromatograph. The stainless steel gas chromatograph column (8' x ¼" O.D.) is packed with 20% "Carbowax" 6000 on Chromosorb P, 60/80 mesh (Applied Science Laboratories, Inc.) and maintained at 70° C. with a 150 ml./minute helium flow rate. The injection port and thermal conductivity detector were maintained at 270° C. and 210° C. respectively. Cyclohexene eluted with a retention time of about 3½ minutes.

Examples 28 to 39 are carried out in a 100 ml. three-neck flask fitted with a side arm for a serum cap, gas inlet tube above liquid level and a gas outlet through a bubler to exclude air. The third neck is stoppered and used when solids are added. The reaction mixture is stirred with a magnetic stirring bar coated with Teflon® polytetrafluoroethylene resin. For Examples 1–39 hydrogen is supplied at atmospheric pressure, temperature is held at 25° C. and time of reaction is 5 hours except that Example 28 is 9 hours, Examples 29 and 33 is 22 hours, 34 is 6.25 hours, Example 34 is 4 hours, Example 36 is 16 hours, and Examples 37–39 is 17 hours. A charge of 20 ml. of benzene is used in Examples 28–39; for the other examples the charge of benzene is 10 ml. The added catalyst compound is 0.26 g. of $RuCl_3 \cdot 3H_2O$ for all of these examples.

TABLE 1

[Hydrogenation of benzene (atmospheric pressure)]

| Ex. | Reducing agent | Alkaline agent | Water (ml.) | Product (percent)[1] Conv. | Cyene |
|---|---|---|---|---|---|
| 1 | $TiCl_3$, 0.3 g. | LiOH, 3.7 g. | 40 | 66.7 | 4 |
| 2 | $TiCl_3$, 0.3 g. | CsOH, 10 ml.[2] | 30 | 40.5 | 10 |
| 3 | $TiCl_3$, 0.3 g. | $Ba(OH)_2$, 3.0 g. | 40 | 43.3 | 4 |
| 4 | $TiCl_3$, 0.3 g. | $Sr(OH)_2$, 5.0 g. | 40 | 19.8 | 8 |
| 5 | $TiCl_3$, 0.3 g. | NaOH, 0.8 g. | 10 | 22.5 | 16 |
| 6 | $TiCl_3$, 0.3 g. | NaOH, 6.2 g. | 40 | 32.2 | 19 |
| 7 | $TiCl_3$, 0.3 g. | NaOH, 9.3 g. | 60 | 32.4 | 8 |
| 8 | $TiCl_3$, 0.3 g. | NaOH, 6.2 g. | 40 | 9.6 | 34 |
| 9 | $TiCl_3$, 0.3 g. | NaOH, 9.3 g. | 60 | 9.7 | 31 |
| 10 | $TiCl_3$, 0.3 g. | NaOH, 12.4 g. | 80 | 8.25 | 31 |
| 11 | $FeCl_2$, 0.2 g. | NaOH, 4.0 g. | 40 | 6.6 | 7 |
| 12 | $NaBH_4$, 0.2 g. | NaOH, 6.2 g. | 40 | 33.1 | 1 |
| 13 | Nb, 0.1 g. | NaOH, 6.2 g. | 40 | 44.2 | 2 |
| 14 | Th, 0.2 g. | NaOH, 6.2 g. | 40 | 29.7 | 1 |
| 15 | $FeCl_2$, 1.2 g. | NaOH, 4.0 g.[3] | 40 | 6.5 | 35 |
| 16 | $TiCl_3$, 0.3 g. | NaOH, 8.5 ml.[3] | 31.5 | 4.3 | 51 |
| 17 | $NaBH_4$, 0.1 g. | NaOH, 8.5 ml.[3] | 31.5 | 19.8 | 1 |
| 18 | Zn, 0.1 g. | NaOH, 8.5 ml.[3] | 31.5 | 2.5 | 44 |
| 19 | Al, 0.1 g. | NaOH, 8.5 ml.[3] | 31.5 | 35.5 | 3 |
| 20 | Th, 0.2 g. | NaOH, 8.5 ml.[3] | 31.5 | 32.6 | 1 |
| 21 | $TiCl_3$, 0.3 g. | NaOH, 8.5 ml.[3] | 31.5 | 8.5 | 36 |
| 22 | $TiCl_3$, 0.3 g. | NaOH, 10 ml.[3] | 30 | 5.9 | 46 |
| 23 | Nb, 0.1 g. | NaOH, 8.5 ml.[3] | 31.5 | 30.7 | 1 |
| 24 | Fe, 0.026 g. | NaOH, 8.5 ml.[3] | 31.5 | 3.3 | 11 |
| 25 | $TiCl_3$, 0.3 g. | NaOH, 1 ml.[3] | 39 | 80 | 3 |
| 26 | $TiCl_3$, 0.3 g. | NaOH, 4 ml.[3] | 36 | 37 | 11 |
| 27 | $TiCl_3$, 0.3 g. | NaOH, 10 ml.[3] | 30 | 7.5 | 38 |
| 28 | $TiCl_3$, 0.3 g. | NaOH, 0.6 g. | 10 | 4.3 | 16.7 |
| 29 | $TiCl_3$, 0.3 g. | NaOH, 1.0 g. | 10 | 11.6 | 5.1 |
| 30 | $TiCl_3$, 0.3 g. | NaOH, 0.8 g. | 10 | 79.5 | 5 |
| 31 | $TiCl_3$, 0.3 g. | NaOH, 1.0 g. | 10 | 33.5 | 10 |
| 32 | $TiCl_3$, 0.3 g. | NaOH, 1.4 g. | 10 | 22.5 | 20 |
| 33 | $NaBH_4$, 0.2 g. | NaOH, 0.5 g. | 10 | 2.45 | 2 |
| 34 | $NaBH_4$, 0.2 g. | KOH, 0.7 g. | 10 | 3.12 | 4.6 |
| 35 | $TiCl_3$, 0.3 g. | NaOH, 0.8 g. | 10 | 9.0 | 11.6 |
| 36 | $TiCl_3$, 0.3 g. | NaOH, 0.6 g. | 10 | 8.0 | 22.5 |
| 37 | $NaBH_4$, 0.1 g. | $NH_4OH$, 2.5 ml. | 7.5 | 0.61 | 15.6 |
| 38 | $NaBH_4$, 0.1 g. | $NH_4OH$, 5 ml. | 5.0 | 0.33 | 40.5 |
| 39 | $NaBH_4$, 0.1 g. | $NH_4OH$, 7.5 ml. | 2.5 | 0.17 | 35.8 |

[1] Conv.=Conversion; Cyene=Cyclohexene.
[2] 53% solution.
[3] 50% aqueous solution.

Examples 40 to 80 summarized in Table 2 are carried out in a 10 ml. stainless steel pressure tube coated with Teflon® polytetrafluoroethylene resin. The catalyst compound reducing agent, water and benzene are charged into the tube under nitrogen purge; after reduction is accomplished, the alkaline agent is introduced. The tube is closed, cooled in Dry Ice, evacuated briefly and charged with nitrogen at 100 atmospheres and held at 100° C. for 8 hours in Examples 40–43 and 45–48 and at 100° C. for sieves above with substitution of the molecular sieve by the particular support of the example. The catalyst metal represents approximately 6% of the weight of the composite.

TABLE 2
[Hydrogenation of benzene (in pressure tubes)]

| Example | Added catalyst compound | Reducing agent | Alkaline agent | Water (ml.) | Benzene (ml.) | Product (percent)[1] Conv. | Cyene |
|---|---|---|---|---|---|---|---|
| 40 | RuCl₃·3H₂O, 0.17 g. | FeCl₂, 0.4 g. | NaOH, 0.2 g. | 1 | 5 | 31.8 | 6 |
| 41 | Ru,[2] 0.5 g. | | NaOH, 0.3 g. | 1 | 5 | 99 | 2 |
| 42 | Ru,[2] 0.5 g. | | NaOH, 0.2 g. | 1 | 5 | 99 | 4 |
| 43 | Ru,[2] 0.5 g. | | NaOH, 0.1 g. | 1 | 5 | 80 | 4 |
| 44 | RuCl₃·3H₂O, 0.1 g. | Hydrogen | NaOH, 0.16 g. | 0.5 | 5 | 8.2 | 6.8 |
| 45 | PdCl₂, 0.2 g. | do | NaOH, 0.1 g. | 2.5 | 2.5 | 74.3 | 1 |
| 36 | RhCl₃, 0.2 g. | do | NaOH, 0.2 g. | 1 | 5 | 20.4 | 1 |
| 47 | PdCl₂, 0.2 g. | NaBH₄, 0.1 g. | MaOH, 0.1 g. | 1 | 5 | 78.4 | 2 |
| 48 | RuCl₃·3H₂O, 0.17 g. | NaBH₄, 0.1 g. | NaOH, 1.0 g. | 1 | 5 | 5.1 | 6.0 |
| 49 | Ru,[3] 0.1 g. | | NaOH, 0.8 ml.[4] | 3.0 | 2 | 88.3 | 18 |
| 50 | Ru,[3] 0.1 g. | | NH₄OH, 3 ml. (conc.) | | 2 | 21.8 | 18 |
| 51 | Ru,[3] 0.1 g. | | (C₂H₅)₃H, 1.5 ml | 1.5 | 2 | 18.7 | 17 |
| 52 | Ru,[5] 0.1 g. | | NaOH, 0.8 ml.[4] | 3.0 | 2 | 8.05 | 24 |
| 53 | Ru,[6] 0.1 g. | | NaOH, 0.8 ml.[4] | 3.0 | 2 | 1.3 | 20 |
| 54 | Ru,[7] 0.1 g. | | NaOH, 0.8 ml.[4] | 3.0 | 2 | 18.2 | 35 |
| 55 | Ru,[3] 0.1 g. | | NaOH, 0.62 g. | 4 | 2 | 29.65 | 23 |
| 56 | Ru,[8] 0.1 g. | | NaOH, 0.8 ml. | 3 | 2 | 20.85 | 26 |
| 57 | Ru,[9] 0.1 g. | | NaOH, 0.8 ml. | 3 | 2 | 87.25 | 8 |
| 58 | Ru,[10] 0.1 g. | | NaOH, 0.8 ml. | 3 | 2 | 8.5 | 36 |
| 59 | Ru,[3] 0.1 g. | | NaOH, 0.8 ml. | 3 | 2 | 13 | 50 |
| 60 | Ru,[11] 0.1 g | | NaOH, 0.8 ml. | 3 | 2 | 64 | 23 |
| 61 | Ru,[9] 0.1 g. | | NaOH, 0.8 ml. | 3 | 2 | 10.15 | 44 |
| 62 | Ru,[12] 0.1 g. | | NaOH, 0.8 ml. | 3 | 2 | 84.25 | 13 |
| 63 | Ru,[9] 0.1 g. | | NaOH, 0.8 ml. | 3 | 2 | 21.9 | 32 |
| 64 | Ru,[10] 0.1 g. | | NaOH, 0.8,ml. | 3 | 2 | 17.7 | 48 |
| 65 | Ru,[3] 0.1 g. | | LiOH, 0.37 g. | 4 | 2 | 38.6 | 31 |
| 66 | Ru,[3] 0.1 g. | | RbOH, 1.6 g. | 4 | 2 | 43.7 | 8 |
| 67 | Ru,[3] 0.1 g. | | CsOH, 2.3 g. | 4 | 2 | 38.15 | 9 |
| 68 | Ru,[3] 0.1 g. | | Ba(OH)₂, 1.3 g. | 4 | 2 | 7.4 | 31 |
| 69 | Ru,[3] 0.1g. | | Sr(OH)₂, 1.0 g. | 4 | 2 | 21.7 | 12 |
| 70 | RuCl₃·3H₂O, 0.1 g. | Hydrogen[13] | NH₄OH, 0.2 ml. | 0.5 | 5 | 26.1 | 2.4 |
| 71 | RuCl₃·3H₂O, 0.1 g. | Hydrogen[14] | NH₄OH, 0.5 ml. | 0.5 | 5 | 10.5 | 9 |
| 72 | RuCl₃·3H₂O, 0.026 g. | TiCl₃, 0.03 g. | NaOH, 0.4 ml.[4] | 1.5 | 2 | 40.35 | 9.4 |
| 73 | RuCl₃·3H₂O, 0.026 g. | TiCl₃, 0.03 g. | NaOH, 0.4 ml.[4] | 1.5 | 4 | 9.15 | 7.6 |
| 74 | RuCl₃·3H₂O, 0.1 g. | Hydrogen[14] | NH₄OH, 0.2 ml. | 0.5 | 5 | 27.9 | 8.5 |
| 75 | Raney Ni, 2.0 g. | | NaOH, 20 ml.[15] | 20 | 10 | 13.0 | 4.5 |
| 76 | Raney Co., 2.0 g. | | NaOH, 20 ml.[15] | 20 | 10 | [16] 7.7 | 8.2 |
| 77 | PdCl₂, 0.5 g. | Al, 0.2 g. | NaOH, 20 ml.[15] | 20 | 10 | [17] 1.9 | 4.9 |
| 78 | Ni on CaCO₃, 0.5 g. | | NaOH, 20 ml.[15] | 20 | 10 | [17] 1.7 | 7.8 |
| 79 | Fe on CaCO₃, 1.0 g. | NaBH₄ | NaOH, 10 ml.[14] | 30 | 10 | 0.3 | 43.8 |
| 80 | IrCl₃, 0.2 g. | Al, 0.2 g. | NaOH, 10 ml.[14] | 30 | 10 | 1.4 | 3.4 |

[1] Conv.=Conversion; Cyene=Cyclohexane.
[2] Ru on 4A molecular sieve, Linde Division, Union Carbide Corporation, reduced with NaBH₄ as described above.
[3] Ru on 13X molecular sieve, Linde molecular sieve, reduced with NaBH₄.
[4] 50% Aqueous solution.
[5] Ru on basic alumina, cationotropic aluminum oxide, activity Grade 1, M. Woelm. Eschwege, Germany, Alupharm Chemicals.
[6] Ru on silica, Grace Davidson Chemical, PA400, refrigeration grade, Grade 408, mesh size 12-18; Cu, 0.88.
[7] Ru on CaCO₃.
[8] Ru on SK, 40 molecular sieve, Union Carbide International Co.
[9] Ru on 3A molecular sieve.
[10] Run on 3A molecular sieve.
[11] Ru on 10X molecular sieve.
[12] Ru on 4A molecular sieve.
[13] Reduced with hydrogen at 100 atmospheres, reaction then held at 25° C. for 15 hours.
[14] 31% NaOH; similar to ([13]) but run at 175° C. for 5 hours, Hastelloy tube (240 ml.).
[15] 31% aqueous solution, hydrogen pressure, 200 atmospheres, 175°, 5 hrs. Hastelloy tube (240 ml.).
[16] Hydrogen pressure, 400 atmospheres.
[17] Hydrogen pressure, 200 atmospheres.

15 hours in Example 44; with hydrogen at 50 atmospheres and held at 175° C. for 5 hours in Examples 49–69 and 72–73; with hydrogen at 100 atmospheres and held at 25° C. for 15 hours in Example 70 and at 100° C. for 15 hours in Examples 71 and 74. The tube is cooled, vented and the product recovered and analyzed by gas chromatography.

To prepare the ruthenium on molecular sieve catalyst for Example 41 and similar other examples of the specification there is added to a stirred solution of 20.0 g. of RuCl₃·3H₂O in 500 ml. of water 100 g. of 4A powdered molecular sieves (Linde Molecular Sieve—Linde Division—Union Carbide Corporation) followed by slow addition of 5.0 g. of NaBH₄. The mixture is stirred under nitrogen for one hour, filtered and the residue washed three times with water and thereafter vacuum dried. The preparation of ruthenium on other supports for Examples 52, 53 and 54 is carried out as described for molecular The hydrogenations described in Examples 81 to 95 and summarized in Table 3 are carried out as described for Examples 40 to 80 except that a 240 ml. "Hastelloy C" shaker tube is always used as the reaction vessel. All hydrogenations are carried out under hydrogen at 750 p.s.i. and at a temperature of 175° C. The catalyst system in each case is ruthenium on the particular support mentioned in the example, all of which are prepared as described for Example 41 and for Examples 52, 53 and 54. In each case approximately 6% by weight of the catalyst system represents ruthenium.

The effect of concentration of sodium hydroxide concentration on yield of cyclohexene is illustrated in Examples 96–107, summarized in Table 4. For the hydrogenations described in these examples a charge of 100 ml. of benzene is used, temperature is held at 175° C. and hydrogen is supplied at 750 p.s.i. and a "Hastelloy C" shaker tube is used as the reaction vessel.

TABLE 3
[Hydrogenation of benzene over ruthenium on various supports]

| Example | Catalyst Support | Weight (g.) | Alkaline agent | Water (ml.) | Benzene (ml.) | Time (hrs.) | Product Conv. | Cyene |
|---|---|---|---|---|---|---|---|---|
| 81 | Mg(OH)₂ | 0.2 | NaOH, 20 ml.[1] | 20 | 100 | 17 | 27.8 | 49.3 |
| 82 | Ca(OH)₂ | 0.2 | NaOH, 20 ml.[1] | 20 | 100 | 17 | 3.8 | 48.5 |
| 83 | CaCO₃ | 0.2 | NaOH, 20 ml.[1] | 20 | 100 | 17 | 18.2 | 39.4 |
| 84 | MgCO₃ | 0.2 | NaOH, 20 ml.[1] | 20 | 100 | 17 | 6.0 | 51.1 |
| 85 | BaCO₃ | 0.2 | NaOH, 20 ml.[1] | 20 | 100 | 17 | 7.7 | 51.1 |
| 86 | MnCO₃ | 0.5 | NaOH, 20 ml.[1] | 20 | 10 | 2 | 61.7 | 7.0 |
| 87 | NiCO₃ | 0.5 | NaOH, 20 ml.[1] | 20 | 10 | 2 | 7.2 | 16.9 |
| 88 | CoCO₃ | 0.5 | NaOH, 20 ml.[1] | 20 | 10 | 2 | 2.3 | 39.6 |
| 89 | (2) | 0.2 | NaOH, 20 ml.[1] | 20 | 100 | 17 | 15.0 | 36.2 |
| 90 | ZnO | 0.2 | NaOH, 20 ml.[1] | 20 | 100 | 17 | 4.2 | 43.4 |
| 91 | TiO₂ | 0.5 | NaOH, 20 ml.[1] | 20 | 10 | 2 | 8.0 | 57.4 |
| 92 | Al₂O₃ | 0.5 | NaOH, 15 ml. | 25 | 100 | 5 | 71.4 | 9.7 |
| 93 | None | [3] 0.5 | NaOH, 20 ml. | 20 | 100 | 5 | 11.7 | 7.2 |
| 94 | Talc | 0.2 | NaOH, 15 ml. | 25 | 100 | 17 | 17.2 | 38.5 |
| 95 | MgO | 0.2 | NaOH, 15 ml. | 25 | 100 | 17 | 1.5 | 60.3 |

[1] 31% aqueous solution.   [2] 4A molecular sieve.   [3] Approx.

TABLE 4
[Hydrogenation of benzene—Effect of NaOH concentration]

| Example | Catalyst | Water (ml.) | 31% NaOH solution (ml.) | Time (hrs.) | Product (percent) Conv. | Cyene |
|---|---|---|---|---|---|---|
| 96 | Ru on Mg(OH)₂, 0.2 g. | 20 | 20 | 17 | 27.8 | 49.3 |
| 97 | Ru on Mg(OH)₂, 0.2 g. | 25 | 15 | 17 | 54.0 | 38.9 |
| 98 | Ru on Mg(OH)₂, 0.2 g. | 30 | 10 | 17 | 93.7 | 15.3 |
| 99 | Ru on Mg(OH)₂, 0.1 g. | 30 | 10 | 17 | 27.7 | 52.9 |
| 100 | Ru on Mg(OH)₂, 0.1 g. | 35 | 5 | 17 | 23.8 | 17.3 |
| 101 | Ru on Mg(OH)₂, 0.1 g. | 40 | 0 | 5 | 45.2 | 13.3 |
| 102 | Ru on Mg(LH)₂, 0.1 g. | 0 | 0 | 5 | 55.7 | 1.9 |
| 103 | Ru on Al₂O₃, 0.1 g. | 40 | 0 | 5 | 30.6 | 33.0 |
| 104 | Ru on Al₂O₃, 0.1 g. | 0 | 0 | 5 | 100 | 0 |
| 105 | Ru on ZnO, 0.1 g. | 40 | 0 | 5 | 3.4 | 52.7 |
| 106 | Ru on ZrO₂, 0.1 g. | 40 | 0 | 5 | 8.9 | 24.5 |
| 107 | Ru on talc, 0.1 g. | 40 | 0 | 5 | 17.1 | 15.6 |

Example 108

Under a nitrogen purge a reaction flask is charged with 0.26 g. of RuCl₃·3H₂O, 0.3 g. of TiCl₃, 6.2 g. of NaOH, 40 ml. of H₂O, and 10 ml. of toluene. The mixture is maintained at 25° C. with hydrogen bubbled through the reaction at 1 atmosphere for 5 hours. Gas chromatographic analysis shows that the crude organic layer contains 2.2% hydrogenation products of which 77% is

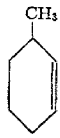

11% is

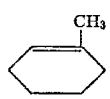

and 12% is

Example 109

In a nitrogen purge 0.5 g. of ruthenium on 4A molecular sieve, prepared as in Example 41, 0.2 g. of NaOH, 1 ml. of H₂O, and 5 ml. of toluene are charged to a 10 ml., stainless steel pressure tube coated with Teflon®. The tube is closed, cooled in Dry Ice, evacuated briefly, charged with hydrogen to 100 atmospheres and held at 100° C. for 8 hours. The tube is cooled, vented, and the products recovered. Gas chromatographic analysis shows that the crude organic layer contains 10.0% hydrogenation products of which 75% is

6% is

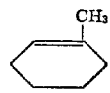

and 18% is

Example 110

In a nitrogen purge 0.026 g. of RuCl₃·3H₂O, 0.03 g. of TiCl₃, 0.8 ml. of NaOH 50% solution, 3.1 ml. of H₂O, and 2 ml. of toluene are charged to a pressure tube as described in Example 109. The tube is closed, cooled in Dry Ice, evacuated briefly, charged with hydrogen to 50 atmospheres, and held at 175° C. for 5 hours and the products recovered. Gas chromatographic analysis shows that the crude organic layer contains 25% hydrogenation products of which 53% is

and 39% is

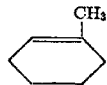

and 8% is

Example 111

In a nitrogen purge 0.026 g. of $RuCl_3 \cdot 3H_2O$, 0.03 g. of $TiCl_3$, 0.8 ml. of NaOH 50% solution, 3.1 ml. of $H_2O$, and 2 ml. of o-xylene are charged to a 10 ml., stainless steel pressure tube and hydrogenation is carried out as described in Example 110. Gas chromatographic analysis shows that the crude organic layer contains 8% hydrogenation products of which 60% is

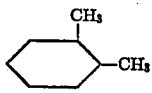

and 40% is

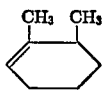

Example 112

In a nitrogen purge charge 0.026 g. of $RuCl_3 \cdot 3H_2O$, 0.03 g. of $TiCl_3$, 0.8 ml. of NaOH 50% solution, 3.1 ml. of $H_2O$, and 2 ml. of p-xylene are charged to a 10 ml., stainless steel pressure tube and hydrogenation is carried out as described in Example 110. Gas chromatographic analysis shows that the crude organic layer contains 19% hydrogenation products of which 85% is

and its isomer and 15% is

Example 113

In a nitrogen purge 0.1 g. of Ru on $CaCO_3$ (prepared as described in Example 54), 0.37 g. of LiOH, 4 ml. of $H_2O$, and 2 ml. of toluene are charged to a 10 ml., stainless steel pressure tube and hydrogenation is carried out as described in Example 110. Gas chromatographic analysis shows that the crude organic layer contains 39% hydrogenation products of which 97% is methyl cyclohexane and 3% is

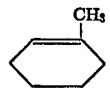

Example 114

In a nitrogen purge 1.0 g. of $RuCl_3 \cdot 3H_2O$, 2 ml. of pyridine, 10 ml. of $H_2O$, and 40 ml. of benzene are charged to a 400 ml., stainless steel pressure tube. The tube is closed, cooled in Dry Ice, evacuated briefly, charged with hydrogen to 100 atmospheres, held at 100° C. for 15 hours, cooled, vented, and the products recovered. Gas chromatographic analysis shows that the crude organic layer contains 6.9% hydrogenation products of which 5.3% is cyclohexene and 94.7% is cyclohexane.

Example 115

Continuous hydrogenation of benzene.—This run is carried out in a glass column equipped with a shaft fitted alternately with stirrer blades and metal discs to act as baffles, as well as vertical baffles along the wall to provide better mixing. The stirrers and baffles are coated with Teflon® polytetrafluoroethylene resin. In the operation the reactor system is purged well with nitrogen and the column is filled with premixed catalyst. Hydrogen and benzene are fed to the bottom of the column and product recovered by overflow from a lower side arm at the top of the column.

In a typical run the reaction column is charged with a premixed catalyst composed of 0.52 g. of $RuCl_3 \cdot 3H_2O$, 0.6 g. of $TiCl_3$, 17 ml. of NaOH (50% by weight in water) and 53 ml. of water. A total of 13 ml. of benzene is fed with a syringe pump at a rate of 6.5 ml. per hour while hydrogen is fed into the column at a rate of about one bubble per second. Pressure of hydrogen at the top of the column is one atmosphere. Temperature is held at 25° C. After two hours gas chromatographic analysis shows the crude product flowing from the column to contain 1.45% of hydrogenation products, of which 46% is cyclohexene and 54% is cyclohexane.

In Examples 116–125 the reactor is charged under a nitrogen purge.

Example 116

Hydrogenation of benzophenone.—The following experiment is carried out in a 10 ml. stainless steel pressure tube coated with Teflon® tetrafluoroethylene resin. The tube is charged with 0.026 g. of $RuCl_3 \cdot 3H_2O$, 0.03 g. of $TiCl_3$, 0.1 g. of benzophenone, 1.0 ml. of cyclohexane, 3.1 ml. of $H_2O$, and 0.8 ml. of 50% aqeuous NaOH in that order. The tube is sealed, cooled in Dry Ice, evacuated briefly, charged with hydrogen at 50 atmospheres at 70° C. and held at 70° C. for 8 hours. The tube is cooled, vented and the product is extracted twice with 5 ml. of cyclohexane. The cyclohexane is evaporated under vacuum and the residue analyzed by gas chromatography. Conversion is complete to give the products shown below

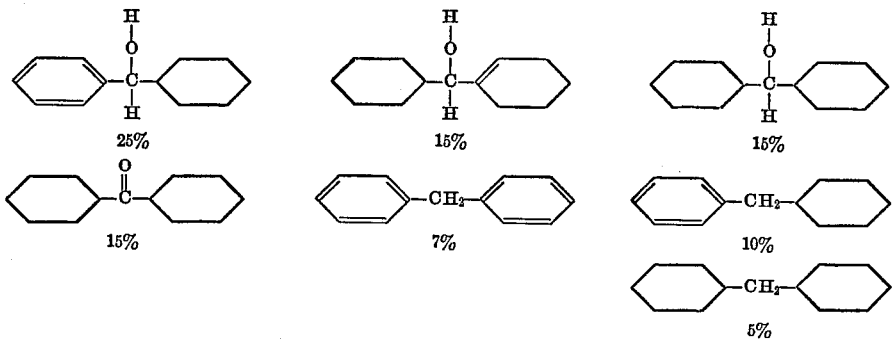

Example 117

Hydrogenation of anisole.—The reaction flask is charged with 0.2 g. of $RhCl_3$, 0.3 g. of $TiCl_3$, 31.5 ml. of water, 8.5 ml. of 50% aqueous NaOH and 10 ml. of anisole. The mixture is maintained at 25° C. with hydrogen bubbled through the reaction at 1 atmosphere for 5 hours. Gas chromatographic analysis shows that the crude organic layer contains hydrogenation products of which 11.4% is methoxycyclohexene and 45.6% is methoxycyclohexane.

Example 118

Hydrogenation of trifluoromethylbenzene.—The reaction flask is charged with 0.26 g. of RuCl$_3$·3H$_2$O, 0.3 g. of TiCl$_3$, 35 ml. of water, 5 ml. of 50% aqueous NaOH and 10 ml. of trifluoromethylbenzene. The mixture is maintained at 25° C. with hydrogen bubbled through the reaction at 1 atmosphere for 5 hours. Gas chromatographic analysis shows that the crude organic layer contains 2.4% hydrogenation products of which 22.5% is

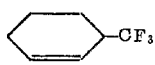

and its isomers.

Example 119

Hydrogenation of fluorobenzene.—The reaction flask is charged with 0.26 g. of RuCl$_3$·3H$_2$O, 0.3 g. of TiCl$_3$, 31.5 ml. of water, 8.5 ml. of 50% aqueous NaOH and 10 ml. of fluorobenzene. The mixture is maintained at 25° C. with hydrogen bubbled through the reaction at 1 atmosphere for 5 hours. Gas chromatographic analysis shows that the crude organic layer contains 8.6% hydrogenation products of which 10.4% is cyclohexene, 8.6% is cyclohexane and 81.6% is benzene.

Example 120

Hydrogenation of bromobenzene.—The following reaction is run in a glass reactor flask containing Teflon® polytetrafluoroethylene resin coated baffles and stirrer blades. Stirring is at the rate of 1000 r.p.m.

The reaction flask is charged with 0.26 g. of

RuCl$_3$·3H$_2$O 31.5 ml. of water, 0.3 g. of TiCl$_3$, 8.5 ml. of 50% aqueous NaOH and 10 ml. of bromobenzene. The mixture is maintained at 25° C. and hydrogen bubbled through the reaction at 1 atmosphere for 4.5 hours. Gas chromatographic analysis shows that the crude organic layer contains 13.3% benzene, 2.9% cyclohexene and 1.7% cyclohexane.

Example 121

Hydrogenation of 1-chloro-2-fluorobenzene.—The reaction flask is charged with 0.26 g. of RuCl$_3$·3H$_2$O, 31.5 ml. of H$_2$O, 0.3 g. of TiCl$_3$, 8.5 ml. of 50% aqueous NaOH, 10 ml. of toluene and 2.0 g. of 1-chloro-2-fluorobenzene. The mixture is maintained at 25° C. with hydrogen bubbled through the reaction at 1 atmosphere for 5 hours. Gas chromatographic analysis shows that the crude organic layer contains 2.8% cyclohexane, 3.7% cyclohexene, 5.3% benzene, and 6.2% fluorobenzene giving a total conversion of 18%. Thus of the aromatic hydrogenated 33% is cyclohexane and 67% is cyclohexene.

Example 122

Hydrogen of p-dichlorobenzene.—The reaction is carried out by the same procedure as that for Example 121, but with 5.0 g. of p-dichlorobenzene. Gas chromatographic analysis shows that the crude organic layer contains 0.3% cyclohexane, 0.9% cyclohexene, 3.6% benzene and 5.1% chlorobenzene giving a total conversion of 9.9%. Thus, of the aromatic hydrogenated 25% is cyclohexane and 75% is cyclohexene.

Example 123

Hydrogenation of m-dichlorobenzene.—The reaction is carried out by the same procedure as that for Example 121, but with 3.88 ml. of m-dichlorobenzene. Gas chromatographic analysis shows that the crude organic layer contains 1.2% cyclohexane, 1.4% cyclohexene, 11.0% benzene, and 7.9% chlorobenzene giving a total conversion of 21.5%. Thus, of the aromatic hydrogenated 46% is cyclohexane and 54% is cyclohexene.

Example 124

Hydrogenation of o-dichlorobenzene.—The reaction is carried out by the same procedure as that for Example 121 but with 3.83 ml. of o-dichlorobenzene. Gas chromatographic analysis shows that the crude organic layer contains 2.7% cyclohexane, 2.2% cyclohexene, 21.1% benzene, and 11.7% chlorobenzene giving a total conversion of 38%. Thus, of the aromatic hydrogenated 55% is cyclohexane and 45% is cyclohexene.

Example 125

1-chloro-3-fluorobenzene.—The reaction is carried out by the same procedure as that for Example 121, but with 2.0 g. of 1-chloro-3-fluorobenzene. Gas chromatographic analysis shows that the crude organic layer contains 0.5% cyclohexane, 0.7% cyclohexene, 7.1% benzene and 13% fluorobenzene, giving a total conversion of 21%. Thus, of the aromatic hydrogenated 41% is cyclohexane and 59% is cyclohexene.

SECTION B

Hydrogenation with aqueous alkaline solution, Group VIII metal catalyst and cationic modifier (1) ZnCl$_2$ as modifier (Table 5) The hydrogenations described in Examples 1 to 4 are carried out in a glass reactor under hydrogen at atmospheric pressure, as described under Section A for Examples 1–27.

Examples 5–6 are carried out in a laboratory reactor which comprises a Jurguson sight glass fitted with a circulating pump in a closed loop, a means for air-free introduction of reactants, ports for sampling and means for continuous monitoring of temperature and pressure, with total capacity of about 1000 ml.

Examples 7–13, showing particularly the effect of increasing amounts of the promoter, are carried out in a stainless steel pressure tube.

TABLE 5
[Hydrogenations with zinc chloride modifier]

| Ex. | Added catalyst compound | Reducing agent | ZnCl$_2$ (g.) | Benzene (ml.) | H$_2$O (ml.) | NaOH (ml.) | Temp. (° C.) | Hydrogen (p.s.i.) | Time (hrs.) | Benzene converted (percent) | Cyene [1] yield (percent) |
|---|---|---|---|---|---|---|---|---|---|---|---|
| 1 | RuCl$_3$·3H$_2$O, 0.26 g | TiCl$_3$, 0.3 g | 0.3 | 10 | 40 | ([3]) | 25 | ([2]) | 4.5 | 1.53 | 84 |
| 2 | RuCl$_3$·3H$_2$O, 0.26 g | TiCl$_3$, 0.3 g | 0.2 | 10 | 31.5 | [4] 8.5 | 25 | ([2]) | 5 | 2.0 | 72 |
| 3 | RuCl$_3$·3H$_2$O, 0.26 g | TiCl$_3$, 0.3 g | 0.1 | 10 | 31.5 | [4] 8.5 | 25 | ([2]) | 5 | 1.26 | 74 |
| 4 | RuCl$_3$·3H$_2$O, 0.19 g | TiCl$_3$, 0.3 g | 0.05 | 20 | 20 | 1.8 | 25 | ([2]) | 5 | 0.23 | 78 |
| 5 | RuCl$_3$·3H$_2$O, 3.22 g | TiCl$_3$, 3.72 g | 4.8 | 124 | 496 | 76.9 | ca 49 | 48 | 5 | 5.4 | 83 |
| 6 | RuCl$_3$·3H$_2$O, 3.22 g | TiCl$_3$, 3.72 g | 9.6 | 124 | 496 | 76.9 | ca 94 | 48 | 5 | 20 | 65 |
| 7 | RuCl$_3$·3H$_2$O, 1.07 g | TiCl$_3$, 1.24 g | 1.13 | 124 | 83 | 12.8 | 175 | 3,000 | 3 | 57 | 33 |
| 8 | RuCl$_3$·3H$_2$O, 1.07 g | TiCl$_3$, 1.24 g | 0 | 124 | 83 | 12.8 | 175 | 3,000 | 3 | 99 | 3.2 |
| 9 | Ru,[5] 5.0 g | | 0 | 41.3 | 165 | 25.6 | 125 | 750 | 3 | 100 | 0 |
| 10 | Ru,[5] 5.0 g | | 0.80 | 41.3 | 165 | 25.6 | 125 | 750 | 3 | 9.5 | 76 |
| 11 | Ru,[5] 5.0 g | | 1.6 | 41.3 | 165 | 25.6 | 125 | 750 | 3 | 25 | 62 |
| 12 | Ru,[5] 5.0 g | | 2.4 | 41.3 | 165 | 25.6 | 125 | 750 | 3 | 24 | 62 |
| 13 | Ru,[5] 5.0 g | | 3.2 | 41.3 | 165 | 25.6 | 125 | 750 | 3 | 12 | 80 |

[1] Cyene=Cyclohexene.   [2] 1 atmosphere.   [3] 6.2 grams.   [4] 50% aqueous solution.   [5] Ru on 4A molecular sieve.

(2) Other cationic modifiers.—The hydrogenations described in Examples 14 to 26 and summarized in Table 6 are carried out in a 240 ml. "Hastelloy C" shaker tube. A charge of 0.035 g. of catalyst compound $RuCl_3 \cdot 3H_2O$, 0.04 g. of $TiCl_3$ as reducing agent, 100 ml. of benzene, 25 g. of water and 15 ml. of 31% aqueous solution of NaOH is used in each case with the several cationic promoters. The hydrogenations are run in a stainless steel pressure tube under a hydrogenation pressure of 750 p.s.i. at 175° C. for various periods of time shown in the table.

TABLE 6
[Effect of various cationic modifiers on hydrogenation]

| Example | Promoter, g. | Time, (hrs.) | Benzene converted (percent) | Cyclohexene (percent) |
|---|---|---|---|---|
| 14 | None | 17 | 38.3 | 47.8 |
| 15 | do | 5 | 23.8 | 47.1 |
| 16 | do | 2 | 10.4 | 43.1 |
| 17 | $ZnCl_2$, 0.035 g. | 17 | 20.0 | 50.8 |
| 18 | $HgCl_2$, 0.035 g. | 17 | 5.6 | 62.0 |
| 19 | $HgCl$, 0.035 g. | 17 | 14.5 | 51.9 |
| 20 | $FeCl_3$, 0.035 g. | 17 | 1.2 | 53.0 |
| 21 | $FeCl_2$, 0.035 g. | 17 | 0.7 | 79.0 |
| 22 | $CuCl$, 0.035 g. | 17 | 2.1 | 80.7 |
| 23 | $CoCl_2$, 0.035 g. | 17 | 6.1 | 60.3 |
| 24 | $NiCl_2$, 0.035 g. | 17 | 17.1 | 51.1 |
| 25 | $CrCl_2$, 0.035 g. | 17 | 23.3 | 49.4 |
| 26 | $MoCl_2$, 0.035 g. | 17 | 10.8 | 55.8 |

(3) Catalyst supported on molecular sieves.—The hydrogenations of Examples 27–33 are carried out in a laboratory reactor, as described for Examples 5–6 above.

Example 27

This example illustrates hydrogenation wherein the catalyst compound is reduced on a molecular sieve with hydrogen. In a reactor purified with nitrogen a mixture of 3.2 g. $RuCl_3 \cdot 3H_2O$, 76.9 g. NaOH in 400 ml. $H_2O$, and 15 g. of 4A powdered molecular sieve is treated with hydrogen at 48 psi. for 1 hour. At the end of this time a solution of 4.8 g. $ZnCl_2$ in 96 ml. $H_2O$ and 124 ml. of benzene is added and hydrogenation is carried out under hydrogen at 48 p.s.i. for 5 hours at 55° C. Analysis of the crude organic layer by gas chromatography reveals that it contains 3.1% hydrogenation products of which 12% is cyclohexene and 88 % is cyclohexane.

Examples 28–33 (Table 7)

The Ru on molecular sieve catalyst for these examples is prepared as described for Example 41 (Section A).

tube is cooled, vented and the product recovered. Gas chromatographic analysis shows that the crude organic product contains 3% cyclohexene and 97% cyclohexane. Total converison is 29.75%.

Example 35

A charge of 0.1 g. of ruthenium on alumina 0.05 g. of $ZnCl_2$, 1.0 g. of KOH, 4 ml. of water ,and 2 ml. of benzene is placed in a pressure tube. The tube is closed, cooled in Dry Ice, evacuated briefly, charged with hydrogen at 50 atmospheres and held at 175° C. for 5 hours. The tube is cooled, vented, and the product recovered. Gas chromatographic analysis shows the crude organic layer to contain 17% hydrogenation products of which 65% is cyclohexene and 35% cyclohexane.

Example 36

Following the procedure of Example 35 a charge of 0.1 g. of ruthenium on $CaCO_3$, 0.05 g. of $ZnCl_2$, 0.8 ml. of 50% aqueous NaOH, 3 ml. of water and 2 ml. of benzene is found on gas chromatographic analysis of the crude organic layer to give 39.25% of hydrogenation products of which 64% is cyclohexene and 36% is cyclohexane.

Example 37

Following the procedure of Example 35 a charge of 0.1 g. of ruthenium on 10X molecular sieve, 0.1 g. of $ZnCl_2$, 0.8 ml. of 50% aqueous NaOH, 3 ml. of water and 2 ml. of p-xylene is found to give 2% of cyclic olefin products of which 14% is

Example 38

Following the procedure of Example 35, a charge of 0.3 g. of ruthenium on $CaCO_3$, 0.05 g. of $ZnCl_2$, 0.8 ml. of 50% aqueous NaOH, 3 ml. of water, and 2 ml. of toluene is found to give 15% hydrogenation products of which 61% is methyl cyclohexane, 27% is

TABLE 7
[Effect of $ZnCl_2$ modifier, catalyst on molecular sieve—various temperatures and pressures]

| Example | Ru[1] | $ZnCl_2$ (g.) | NaOH (g.) | Water (ml.) | Benzene (ml.) | Temperature (° C.) | Pressure (p.s.i.) | Hours | Product (percent) | |
|---|---|---|---|---|---|---|---|---|---|---|
| | | | | | | | | | Conv. | Cyene |
| 28 | 15 | 4.8 | 76.9 | 496 | 129 | ca. 50 | 47 | 5 | 3.4 | 34 |
| 29 | 15 | 1.6 | 76.9 | 496 | 124 | ca. 55 | 48 | 5 | 27.5 | 23 |
| 30 | 5 | 1.6 | 25.6 | 165 | 41.3 | 100 | 750 | 3 | 7.6 | 75 |
| 31 | 5 | 1.6 | 25.6 | 165 | 41.3 | 175 | 750 | 3 | 85 | 13 |
| 32 | 5 | 1.6 | 25.6 | 165 | 41.3 | 125 | 300 | 3 | 46 | 40 |
| 33 | 5 | 1.6 | 25.6 | 165 | 41.3 | 125 | 1500 | 3 | 12 | 53 |

[1] On molecular sieves prepared as described above.

(4) Other combinations.—The hydrogenations of Examples 34–38 are carried out in a 10 ml. stainless steel pressure tube coated with Teflon ® polytetrafluoroethylene resin and the tube is charged under nitrogen purge.

Example 34

This example illustrates the use of palladium as catalyst with zinc chloride as promoter and wherein the catalyst compound is reduced with hydrogen.

A charge of 0.2 g. of $PdCl_2$, 0.1 g. of $ZnCl_2$, 0.1 g. of NaOH, 2.5 ml. of $H_2O$, and 2.5 ml. of benzene is placed in a pressure tube. The tube is closed, cooled in Dry Ice, evacuated briefly and charged with hydrogen at 100 atmospheres and maintained at 100° C. for 8 hours. The and 12% is

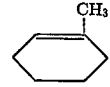

SECTION C

Hydrogenation with aqueous alkaline solution, Group VIII metal catalyst and a carbonyl of chromium, molybdenum or tungsten The hydrogenations of Examples 1–36, summarized in Table 8, are carried out at 25° C. in a glass reactor with hydrogen supplied at atmospheric pressure, as described under Section A for Examples 1–27.

TABLE 8

[Hydrogenation of benzene—use of carbonyl with catalyst system]

| Example | Added catalyst compound | Reducing agent | Alkaline agent | Carbonyl complex | Water (ml.) | Benzene (ml.) | Time (hrs.) | Product (percent)[1] Conv. | Cyene |
|---|---|---|---|---|---|---|---|---|---|
| 1 | $RuCl_3 \cdot 3H_2O$, 0.26 g. | $TiCl_3$, 0.3 g. | NaOH, 8.5 ml.[2] | $Mo(CO)_6$, 0.26 g. | 31.5 | 20 | 21.5 | 3.5 | 56 |
| 2 | $RuCl_3 \cdot 3H_2O$, 0.26 g. | $TiCl_3$, 0.3 g. | NaOH, 8.5 ml.[2] | $Mo(CO)_6$, 0.26 g. | 31 | 10 | 5 | 2.9 | 59 |
| 3 | $RuCl_3 \cdot 3H_2O$, 0.26 g. | $TiCl_3$, 0.3 g. | NaOH, 6.2 g. | $Mo(CO)_6$, 0.26 g. | 40 | 10 | 5 | 4.8 | 50 |
| 4 | $RuCl_3 \cdot 3H_2O$, 0.26 g. | $TiCl_3$, 0.3 g. | NaOH, 8.5 ml.[2] | $Cr(CO)_6$, 0.22 g. | 31.5 | 20 | 21.5 | 7.2 | 50 |
| 5 | $RuCl_3 \cdot 3H_2O$, 0.26 g. | $TiCl_3$, 0.3 g. | NaOH, 8.5 ml.[2] | $Cr(CO)_6$, 0.22 g. | 31.5 | 10 | 5 | 5.25 | 53 |
| 6 | $RuCl_3 \cdot 3H_2O$, 0.26 g. | $TiCl_3$, 0.3 g. | NaOH, 6.2 g. | $Cr(CO)_6$, 0.22 g. | 40 | 10 | 5 | 4.0 | 50 |
| 7 | $RuCl_3 \cdot 3H_2O$, 0.26 g. | $TiCl_3$, 0.3 g. | NaOH, 0.8 g. | $Cr(CO)_6$, 0.2 g. | 10 | 10 | 5 | 26.9 | 30 |
| 8 | $RuCl_3 \cdot 3H_2O$, 0.26 g. | $TiCl_3$, 0.3 g. | NaOH, 8.5 ml.[2] | $W(CO)_6$, 0.3 g. | 31.5 | 20 | 21.5 | 3.0 | 66 |
| 9 | $RuCl_3 \cdot 3H_2O$, 0.19 g. | $TiCl_3$, 0.3 g. | NaOH, 1.63 g. | $W(CO)_6$, 0.65 g. | 22.3 | 21.5 | 5 | 6.85 | 45 |
| 10 | $RuCl_3 \cdot 3H_2O$, 0.18 g. | $TiCl_3$, 0.28 g. | NaOH, 1.26 g. | $W(CO)_6$, 0.44 g. | 26.6 | 22.8 | 5 | 9.1 | 42 |
| 11 | $RuCl_3 \cdot 3H_2O$, 0.19 g. | $TiCl_3$, 0.28 g. | NaOH, 1.36 g. | $W(CO)_6$, 0.5 g. | 20.6 | 19.8 | 5 | 5.25 | 44 |
| 12 | $RuCl_3 \cdot 3H_2O$, 0.20 g. | $TiCl_3$, 0.28 g. | NaOH, 1.37 g. | $W(CO)_6$, 0.48 g. | 21 | 19.5 | 5 | 7.6 | 34 |
| 13 | $RuCl_3 \cdot 3H_2O$, 0.21 g. | $TiCl_3$, 0.28 g. | NaOH, 1.46 g. | $W(CO)_6$, 0.54 g. | 15.1 | 16.4 | 5 | 4.2 | 60 |
| 14 | $RuCl_3 \cdot 3H_2O$, 0.17 g. | $TiCl_3$, 0.2 g. | NaOH, 1.08 g. | $W(CO)_6$, 0.4 g. | 13.5 | 23.4 | 5 | 4.7 | 52 |
| 15 | $RuCl_3 \cdot 3H_2O$, 0.26 g. | $TiCl_3$, 0.3 g. | NaOH, 12.4 g. | $W(CO)_6$, 0.3 g. | 80 | 10 | 5 | 7.7 | 50 |
| 16 | $RuCl_3 \cdot 3H_2O$, 0.26 g. | $TiCl_3$, 0.3 g. | NaOH, 9.3 g. | $W(CO)_6$, 0.3 g. | 60 | 10 | 5 | 7.7 | 32 |
| 17 | $RuCl_3 \cdot 3H_2O$, 0.26 g. | $TiCl_3$, 0.3 g. | NaOH, 4.8 g. | $W(CO)_6$, 0.3 g. | 60 | 10 | 5 | 25.1 | 32 |
| 18 | $RuCl_3 \cdot 3H_2O$, 0.17 g. | $TiCl_3$, 0.3 g. | NaOH, 6.2 g. | $W(CO)_6$, 0.3 g. | 40 | 10 | 5 | 16.1 | 25 |
| 19 | Ru,[3] 0.5 g. | $TiCl_3$, 0.3 g. | NaOH, 0.8 g. | $W(CO)_6$, 0.4 g. | 10 | 10 | 4.5 | 5.4 | 11 |
| 20 | $RuCl_3 \cdot 3H_2O$, 0.17 g. | $NaBH_4$, 0.1 g. | NaOH, 1.08 g. | $W(CO)_6$, 0.4 g. | 13.5 | 13.5 | 6 | 20.7 | 20 |
| 21 | $RuCl_3 \cdot 3H_2O$, 0.26 g. | $TiCl_3$, 0.3 g. | NaOH, 3.2 g. | $W(CO)_6$, 0.3 g. | 40 | 10 | 18 | 41.8 | 26 |
| 22 | $RuCl_3 \cdot 3H_2O$, 0.26 g. | $TiCl_3$, 0.3 g. | NaOH, 2.4 g. | $W(CO)_6$, 0.3 g. | 30 | 10 | 18 | 25 | 28 |
| 23 | $RuCl_3 \cdot 3H_2O$, 0.35 g. | $TiCl_3$, 0.2 g. | NaOH, 0.52 g. | $W(CO)_6$, 0.4 g. | 6.5 | 13.5 | 5 | 4.1 | 46 |
| 24 | $RuCl_3 \cdot 3H_2O$, 0.35 g. | $TiCl_3$, 0.4 g. | NaOH, 0.52 g. | $W(CO)_6$, 0.2 g. | 13.5 | 13.5 | 5 | 36.2 | 13 |
| 25 | $RuCl_3 \cdot 3H_2O$, 0.35 g. | $TiCl_3$, 0.4 g. | NaOH, 1.08 g. | $W(CO)_6$, 0.4 g. | 6.0 | 6.5 | 5.6 | 7.6 | 40 |
| 26 | $RuCl_3 \cdot 3H_2O$, 0.17 g. | $TiCl_3$, 0.2 g. | NaOH, 1.08 g. | $W(CO)_6$, 0.4 g. | 13.5 | 6.5 | 5 | 16.2 | 35 |
| 27 | $RuCl_3 \cdot 3H_2O$, 0.35 g. | $TiCl_3$, 0.4 g. | NaOH, 1.08 g. | $W(CO)_6$, 0.2 g. | 6.5 | 13.5 | 5 | 7.7 | 30 |
| 28 | $RuCl_3 \cdot 3H_2O$, 0.17 g. | $TiCl_3$, 0.2 g. | NaOH, 0.52 g. | $W(CO)_6$, 0.2 g. | 13.5 | 13.5 | 5 | 13.5 | 39 |
| 39 | $RuCl_3 \cdot 3H_2O$, 0.17 g. | $TiCl_3$, 0.4 g. | NaOH, 1.08 g. | $W(CO)_6$, 0.4 g. | 13.5 | 13.5 | 5.75 | 7.7 | 41 |
| 30 | $RuCl_3 \cdot 3H_2O$, 0.35 g. | $TiCl_3$, 0.2 g. | NaOH, 0.52 g. | $W(CO)_6$, 0.4 g. | 6.5 | 13.5 | 22 | 36 | 11 |
| 31 | $RuCl_3 \cdot 3H_2O$, 0.35 g. | $TiCl_3$, 0.2 g. | NaOH, 0.52 g. | $W(CO)_6$, 0.2 g. | 6.0 | 13.5 | 19.75 | 5.5 | 11 |
| 32 | $RhCl_3$, 0.2 g. | $TiCl_3$, 0.3 g. | NaOH, 6.2 g. | $W(CO)_6$, 0.3 g. | 40 | 10 | 5 | 10.1 | 11 |
| 33 | $RhCl_3$, 0.2 g. | $TiCl_3$, 0.3 g. | NaOH, 8.5 ml.[2] | $W(CO)_6$, 0.3 g. | 31.5 | 20 | 21.5 | 1.6 | 13 |
| 34 | $RhCl_3$, 0.2 g. | $TiCl_3$, 0.3 g. | NaOH, 6.2 g. | $Mo(CO)_6$, 0.26 g. | 40 | 10 | 5 | 25.8 | 7 |
| 35 | $RhCl_3$, 0.2 g. | $TiCl_3$, 0.3 g. | NaOH, 8.5 ml.[2] | $Mo(CO)_6$, 0.26 g. | 31.5 | 10 | 5 | 6.95 | 5 |
| 36 | $RhCl_3$, 0.2 g. | $TiCl_3$, 0.3 g. | NaOH, 8.5 ml.[2] | $Cr(CO)_6$, 0.22 g. | 31.5 | 10 | 5 | 3.9 | 2 |
| 37 | $RuCl_3 \cdot 3H_2O$, 1.0 g. | Hydrogen | $NH_4OH$, 5 ml. | $W(CO)_6$, 2.0 g. | 5 | 40 | 15 | 13.3 | 7.1 |
| 38 | $RuCl_3 \cdot 3H_2O$, 1.0 g. | ...do... | $NH_4OH$, 2 ml. | $Cr(CO)_6$, 0.5 g. | 5 | 40 | 15 | 23.0 | 7.3 |
| 39 | $RuCl_3 \cdot 3H_2O$, 1.0 g. | ...do... | NaOH, 0.5 g. | $Mo(CO)_6$, 3.0 g. | 10 | 40 | 15 | 35.8 | 7.5 |
| 40 | $RuCl_3 \cdot 3H_2O$, 1.0 g. | ...do... | NaOH, 0.5 g. | $Mo(CO)_6$, 2.0 g. | 10 | 40 | 15 | 45.7 | 7.4 |
| 41 | $RuCl_3 \cdot 3H_2O$, 0.26 g. | $TiCl_3$, 0.3 g. | NaOH, 1.2 g. | $Mo(CO)_6$, 0.2 g. | 10 | 20 | 19.75 | 7.2 | 46 |
| 42 | $RuCl_3 \cdot 3H_2O$, 0.26 g. | $TiCl_3$, 0.3 g. | NaOH, 1.0 g. | $Mo(CO)_6$, 0.26 g. | 10 | 20 | 19.5 | 13.1 | 38 |
| 43 | $RuCl_3 \cdot 3H_2O$, 0.26 g. | $TiCl_3$, 0.3 g. | NaOH, 0.8 g. | $Mo(CO)_6$, 0.26 g. | 10 | 20 | 19.5 | 7.3 | 41 |
| 44 | $RuCl_3 \cdot 3H_2O$, 0.26 g. | $TiCl_3$, 0.3 g. | NaOH, 0.4 g. | $Mo(CO)_6$, 0.26 g. | 10 | 20 | 19.5 | 41 | 13 |
| 45 | $RuCl_3 \cdot 3H_2O$, 0.26 g. | $TiCl_3$, 0.3 g. | NaOH, 0.6 g. | $Mo(CO)_6$, 0.26 g. | 10 | 20 | 17 | 7.5 | 33.4 |
| 46 | $RuCl_3 \cdot 3H_2O$, 0.26 g. | $FeCl_2$, 0.4 g. | NaOH, 1.2 g. | $Mo(CO)_6$, 0.26 g. | 10 | 20 | 16.75 | 0.9 | 53.1 |
| 47 | $RuCl_3 \cdot 3H_2O$, 0.2 g. | $NaBH_4$, 0.2 g. | NaOH, 0.5 g. | $Mo(CO)_6$, 0.4 g. | 10 | 20 | 2.25 | 2.5 | 4 |
| 48 | $RuCl_3 \cdot 3H_2O$, 0.2 g. | $NaBH_4$, 0.2 g. | $NH_4OH$, 5 ml. | $Mo(CO)_6$, 0.4 g. | 5 | 20 | 16.75 | 1.5 | 36.3 |
| 49 | $RuCl_3 \cdot 3H_2O$, 0.26 g. | $NaBH_4$, .05 g. | NaOH, 0.8 g. | $W(CO)_6$, 0.3 g. | 10 | 20 | 21 | 35 | 14 |
| 50 | $RuCl_3 \cdot 3H_2O$, 0.26 g. | $TiCl_3$, 0.3 g. | $N_2OH$, 1.0 g. | $W(CO)_6$, 0.3 g. | 10 | 20 | 22.75 | 13.5 | 29 |
| 51 | $RuCl_3 \cdot 3H_2O$, 0.26 g. | $TiCl_3$, 0.3 g. | NaOH, 0.6 g. | $W(CO)_6$, 0.3 g. | 10 | 20 | 22.75 | 26.2 | 28 |
| 52 | $RuCl_3 \cdot 3H_2O$, 0.26 g. | $TiCl_3$, 0.3 g. | NaOH, 0.4 g. | $W(CO)_6$, 0.3 g. | 10 | 20 | 22.75 | 36.2 | 18 |
| 53 | $RuCl_3 \cdot 3H_2O$, 0.26 g. | V, 0.05 g. | NaOH, 0.8 g. | $W(CO)_6$, 0.3 g. | 10 | 20 | 22 | 1.52 | 24.5 |
| 54 | $RuCl_3 \cdot 3H_2O$, 0.26 g. | Nb, 0.1 g. | NaOH, 0.8 g. | $W(CO)_6$, 0.3 g. | 10 | 20 | 22 | 52.9 | 11.1 |
| 55 | $RuCl_3 \cdot 3H_2O$, 0.26 g. | Th, 0.2 g. | NaOH, 0.8 g. | $W(CO)_6$, 0.3 g. | 10 | 20 | 19.6 | 33.5 | 11 |
| 56 | $RuCl_3 \cdot 3H_2O$, 0.26 g. | Al, 0.1 g. | NaOH, 0.8 g. | $W(CO)_6$, 0.3 g. | 10 | 20 | 17.6 | 78.6 | 4.8 |
| 57 | $RuCl_3 \cdot 3H_2O$, 0.26 g. | $TiCl_3$, 0.6 g. | NaOH, 0.8 g. | $W(CO)_6$, 0.3 g. | 10 | 20 | 18 | 16.2 | 34 |
| 58 | $RuCl_3 \cdot 3H_2O$, 0.26 g. | $NaBH_4$, 0.1 g. | NaOH, 0.8 g. | $W(CO)_6$, 0.3 g. | 10 | 20 | 21.8 | 38.2 | 14 |
| 59 | $RuCl_3 \cdot 3H_2O$, 0.26 g. | $SnCl_2$, 0.1 g. | NaOH, 0.05 g. | $W(CO)_6$, 0.3 g. | 10 | 20 | 18.5 | 3.0 | 3.9 |
| 60 | $RuCl_3 \cdot 3H_2O$, 0.26 g. | $TiCl_3$, 0.3 g. | NaOH, 1.2 g. | $W(CO)_6$, 0.3 g. | 10 | 20 | 17 | 4.9 | 30.7 |
| 61 | $RuCl_3 \cdot 3H_2O$, 0.26 g. | $FeCl_2$, 0.5 g. | NaOH, 0.5 g. | $W(CO)_6$, 0.3 g. | 10 | 20 | 16 | 1.3 | 33.7 |
| 62 | $RuCl_3 \cdot 3H_2O$, 0.26 g. | $FeCl_2$, 0.26 g. | NaOH, 0.5 g. | $W(CO)_6$, 0.3 g. | 10 | 20 | 15.3 | 0.56 | 47.4 |
| 63 | $RuCl_3 \cdot 3H_2O$, 0.26 g. | $FeCl_2$, 0.26 g. | NaOH, 0.5 g. | $W(CO)_6$, 0.1 | 10 | 20 | 15.3 | 1.6 | 38.2 |
| 64 | $RuCl_3 \cdot 3H_2O$, 0.26 g. | $FeCl_2$, 0.26 g. | NaOH, 0.5 g. | $W(CO)_6$, 0.6 | 10 | 20 | 15.5 | 0.71 | 44.0 |
| 65 | $RuCl_3 \cdot 3H_2O$, 0.2 g. | $NaBH_4$, 0.26 g. | NaOH, 0.5 g. | $W(CO)_6$, 0.5 | 10 | 20 | 5.5 | 5.6 | 7.1 |
| 66 | $RhCl_3$, 0.2 g. | $TiCl_3$, 0.3 g. | NaOH, 0.8 g. | $W(CO)_6$, 0.3 | 10 | 20 | 19.75 | 1.5 | 24.2 |
| 67 | $RuCl_3 \cdot 3H_2O$, 0.26 g. | $TiCl_3$, 0.3 g. | NaOH, 1.0 g. | $Cr(CO)_6$, 0.22 g. | 10 | 20 | 6.15 | 13.5 | |
| 68 | $RuCl_3 \cdot 3H_2O$, 0.26 g. | $TiCl_3$, 0.3 g. | NaOH, 0.8 g. | $Cr(CO)_6$, 0.22 g. | 10 | 20 | 6.15 | 13.5 | |
| 69 | $RuCl_3 \cdot 3H_2O$, 0.26 g. | $TiCl_3$, 0.3 g. | NaOH, 0.4 g. | $Cr(CO)_6$, 0.22 g. | 10 | 20 | 6.15 | 37.6 | |

[1] Conv.=conversion; Cyene=cyclohexene.
[2] 50% aqueous solution.
[3] Ru on 4A molecular sieve—made as described for Example 41 (Section A).

The hydrogenations for Examples 37–40 are run at 100° C. in a 400 ml. stainless steel pressure tube coated with Teflon® polytetrafluoroethylene resin, under hydrogen pressure of 100 atmospheres. The hydrogenation for Examples 41–69 are carried out in the glass apparatus described for Examples 1–36, with hydrogen supplied at atmospheric pressure. The temperature for Examples 1–36 and 41–69 is 25° C.

The hydrogenations in Examples 70–75 are carried out in a 10 ml. stainless steel pressure tube coated with Teflon® polytetrafluoroethylene resin. The tube is charged under nitrogen purge.

Example 70

A charge of 0.1 g. of ruthenium on 10X molecular sieve, prepared as described in Example 19, 0.05 g. of $W(CO)_6$, 0.8 ml. of 50% aqueous NaOH, 3 ml. of $H_2O$, and 2 ml. of p-xylene is placed in a pressure tube. The tube is closed, cooled in Dry Ice evacuated briefly, charged with hydrogen at 50 atmospheres, then held at 175° C. for 5 hours. Gas chromatographic analysis shows the recovered crude organic layer to contain 9% of cyclic olefin products of which 36% is

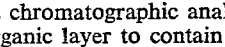

Example 71

Following the procedure of Example 70 a charge of 0.1 g. of ruthenium on 10X molecular sieve, 0.05 g. of $W(CO)_6$, 1.0 g. of KOH, 3 ml. of water and 2 ml. of benzene shows 12.7% hydrogenated products of which 57% is cyclohexene and 43% is cyclohexane.

Example 72

Following the procedure of Example 7, a charge of 0.1 g. of ruthenium on 10X molecular sieve, 0.05 g. of $W(CO)_6$, 0.8 ml. of 50% aqueous NaOH, 3 ml. of $H_2O$, and 2 ml. of toluene shows 7% hydrogenation products of which 42% is methyl cyclohexane, 49% is

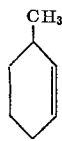

and 9% is

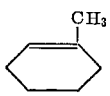

Example 73

Following the procedure of Example 70 a charge of 0.3 g. of ruthenium on silica,[1] 0.05 g. of W(CO)$_6$, 0.8 ml. of 50% aqueous NaOH, 3 ml. of H$_2$O, and 2 ml. of benzene shows 4.6% hydrogenation products of which 90% is cyclohexane and 10% is cyclohexene.

4% is indicated to be

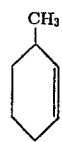

and 15% is indicated to be

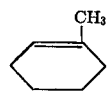

SECTION D

Hydrogenation with aqueous alkaline solution, Group VIII metal catalyst, a cationic modifier and a carbonyl of chromium, molybdenum or tungsten The hydrogenations of Examples 1–30, summarized in Table 9, are carried out in the glass reactor described in Section A for Examples 1–27. The hydrogenations are run TABLE 9
[Hydrogenation of benzene with cationic promoter and carbonyl complex]

| Example | Reducing agent | Alkaline agent | Carbonyl complex | Cationic promoter | Water (ml.) | Benzene (ml.) | Time (hrs.) | Product (percent) Conv. | Cyene |
|---|---|---|---|---|---|---|---|---|---|
| 1 | TiCl$_3$, 0.3 g. | NaOH, 6.2 g. | W(CO)$_6$, 0.3 g. | ZnCl$_2$, 0.3 g. | 40 | 10 | 5 | 0.39 | 88 |
| 2 | TiCl$_3$, 0.3 g. | NaOH, 6.2 g. | W(CO)$_6$, 0.3 g. | ZnCl$_2$, 0.1 g. | 40 | 10 | 5 | 0.85 | 82 |
| 3 | TiCl$_3$, 0.3 g. | NaOH, 6.2 g. | W(CO)$_6$, 0.3 g. | ZnCl$_2$, 0.2 g. | 40 | 10 | 5 | 0.7 | 86 |
| 4 | TiCl$_3$, 0.5 g. | NaOH, 6.2 g. | W(CO)$_6$, 0.3 g. | ZnCl$_2$, 0.1 g. | 40 | 10 | 5 | 0.42 | 75 |
| 5 | TiCl$_3$, 0.2 g. | NaOH, 6.2 g. | W(CO)$_6$, 0.3 g. | ZnCl$_2$, 0.1 g. | 40 | 10 | 5 | 0.39 | 83 |
| 6 | TiCl$_3$, 0.4 g. | NaOH, 6.2 g. | W(CO)$_6$, 0.3 g. | ZnCl$_2$, 0.1 g. | 40 | 10 | 5 | 0.41 | 85 |
| 7 | TiCl$_3$, 0.3 g. | NaOH, 9.0 g. | W(CO)$_6$, 0.3 g. | ZnCl$_2$, 0.1 g. | 40 | 10 | 5 | 0.4 | 87 |
| 8 | TiCl$_3$, 0.3 g. | NaOH, 8.0 g. | W(CO)$_6$, 0.3 g. | ZnCl$_2$, 0.1 g. | 40 | 10 | 5 | 0.5 | 85 |
| 9 | TiCl$_2$, 0.3 g. | NaOH, 7.0 g. | W(CO)$_6$, 0.3 g. | ZnCl$_2$, 0.1 g. | 40 | 10 | 5 | 1.3 | 80 |
| 10 | TiCl$_3$, 0.3 g. | NaOH, 5.0 g. | W(CO)$_6$, 0.3 g. | ZnCl$_2$, 0.1 g. | 40 | 10 | 5 | 1.85 | 83 |
| 11 | TiCl$_3$, 0.3 g. | NaOH, 4.0 g. | W(CO)$_6$, 0.3 g. | ZnCl$_2$, 0.1 g. | 40 | 10 | 5 | 3.75 | 78 |
| 12 | TiCl$_3$, 0.3 g. | NaOH, 3.0 g. | W(CO)$_6$, 0.3 g. | ZnCl$_2$, 0.1 g. | 40 | 10 | 5 | 1.2 | 80 |
| 13 | TiCl$_3$, 0.3 g. | NaOH, 2.0 g. | W(CO)$_6$, 0.3 g. | ZnCl$_2$, 0.1 g. | 40 | 10 | 5 | 1.35 | 74 |
| 14 | TiCl$_3$, 0.3 g. | NaOH, 1.0 g. | W(CO)$_6$, 0.3 g. | ZnCl$_2$, 0.1 g. | 40 | 10 | 5 | 1.5 | 15 |
| 15 | TiCl$_3$, 0.3 g. | NaOH, 6.2 g. | W(CO)$_6$, 0.3 g. | ZnCl$_2$, 0.1 g. | 40 | 10 | 5 | 2.33 | 83 |
| 16 | TiCl$_3$, 0.3 g. | NaOH, 8.5 ml.[1] | W(CO)$_6$, 0.3 g. | ZnSO$_4$, 0.1 g. | 31.5 | 10 | 5 | 0.75 | 84 |
| 17 | TiCl$_3$, 0.3 g. | NaOH, 8.5 ml.[1] | Mo(CO)$_6$, .26 g. | ZnCl$_2$, 0.2 g. | 31.5 | 20 | 22.5 | 1.75 | 83 |
| 18 | TiCl$_3$, 0.3 g. | NaOH, 8.5 ml.[1] | W(CO)$_6$, 0.3 g. | ZnCl$_2$, 0.2 g. | 31.5 | 20 | 22.5 | 1.45 | 85 |
| 19 | TiCl$_3$, 0.3 g. | NaOH, 8.5 ml.[1] | Mo(CO)$_6$, 0.26 g. | ZnCl$_2$, 0.2 g. | 31.5 | 10 | 5 | 0.68 | 82 |
| 20 | TiCl$_3$, 0.3 g. | NaOH, 8.5 ml.[1] | W(CO)$_6$, 0.3 g. | ZnCl$_2$, 0.2 g. | 31.5 | 10 | 5 | 0.83 | 86 |
| 21 | TiCl$_3$, 0.3 g. | NaOH, 6.2 g. | W(CO)$_6$, 0.3 g. | ZnCl$_2$, 0.2 g. | 40 | 10 | 5 | 1.75 | 85 |
| 22 | TiCl$_3$, 0.45 g. | NaOH, 7.0 g. | W(CO)$_6$, 0.45 g. | ZnCl$_2$, 0.2 g. | 40 | 10 | 5 | 1.75 | 84 |
| 23 | TiCl$_3$, 0.15 g. | NaOH, 6.2 g. | W(CO)$_6$, 0.15 g. | ZnCl$_2$, 0.05 g. | 40 | 10 | 5 | 0.6 | 83 |
| 24 | TiCl$_3$, 0.3 g. | NaOH, 4.0 g. | W(CO)$_6$, 0.3 g. | ZnCl$_2$, 0.1 g. | 40 | 10 | 5 | 2.47 | 79 |
| 25 | TiCl$_3$, 0.3 g. | NaOH, 12.4 g. | W(CO)$_6$, 0.3 g. | ZnCl$_2$, 0.1 g. | 70 | 10 | 5 | 0.78 | 78 |
| 26 | TiCl$_3$, 0.3 g. | NaOH, 6.2 g. | W(CO)$_6$, 0.3 g. | ZnCl$_2$, 0.05 g. | 40 | 10 | 5 | 1.1 | 82 |
| 27 | TiCl$_3$, 0.3 g. | NaOH, 6.2 g. | Cr(CO)$_6$, 0.2 g. | ZnCl$_2$, 0.1 g. | 40 | 10 | 5 | 1.4 | 82 |
| 28 | TiCl$_3$, 0.3 g. | NaOH, 6.2 g. | Mo(CO)$_6$, 0.26 g. | ZnCl$_2$, 0.1 g. | 40 | 10 | 5 | 0.79 | 84 |
| 29 | TiCl$_3$, 0.3 g. | NaOH, 6.2 g. | W(CO)$_6$, 0.3 g. | ZnCl$_2$, 0.1 g. | 40 | 10 | 5 | 0.88 | 87 |
| 30 | TiCl$_3$, 0.3 g. | NaOH, 6.2 g. | W(CO)$_6$, 0.3 g. | ZnCl$_2$, 0.1 g. | 40 | 10 | 4.5 | 2.02 | 85 |

[1] 50% aqueous solution.

Example 74

Following the produre of Example 70, a charge of 0.1 g. of ruthenium on 10X molecular sieve, 0.05 g. of W(CO)$_6$, 1.0 g. of KOH, 3 ml. of H$_2$O, and 2 ml. of benzene shows 12.7% hydrogenation products of which 57% is cyclohexene and 43% is cyclohexane.

Example 75

Under a nitrogen purge a charge of 0.1 g. of RuCl$_3$·3H$_2$O, 0.1 g. of W(CO)$_6$, 0.1 g. of NaOH, 2.5 ml. of H$_2$O, and 2.5 ml. of toluene is placed in a pressure tube as described in Example 70. The tube is charged with hydrogen at 100 atmospheres, and held at 100° C. for 8 hours. Gas chromatographic analysis of the recovered product shows it to contain 15.9% hydrogenation products of which 81% is

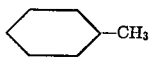

[1] Grace Davidson Chemical Silica Gel PA 400; Refrigeration Grade 408: Mesh size 12–28; Cu—0.88%.

at 25° C. with hydrogen being supplied at atmospheric pressure. The amount of catalyst compound, RuCl$_3$·3H$_2$O charged for Examples 1–21 and 24–30 is 0.26 g.; for Example 22 the amount is 0.4 g. and for Example 23 the amount is 0.13 g. In Examples 1–15 there is added to the charge 1 ml. of concentrated hydrochloric acid.

For Examples 31–38, the reaction mixture is prepared by adding the appropriate amounts of W(CO)$_6$ and ZnCl$_2$ with 100 ml. of benzene to a stirred solution of 3.22 g. of RuCl$_3$·3H$_2$O in 250 ml. of water in a reaction flask flushed with nitrogen. To this is added TiCl$_3$ through an air-free dropping funnel which is washed in with 24 ml. of benzene. Stirring is continued for 10 minutes followed by addition of a solution of 76.9 g. of NaOH in 246 ml. of water. The mixture is divided into 3 equal portions, each of which is used in individual runs to follow.

Example 31

In a nitrogen purge a catalyst mixture, prepared as described above, containing 1.07 g. RuCl$_3$·3H$_2$O, 1.24 g. W(CO)$_6$, 1.24 g. TiCl$_3$, 1.6 g. ZnCl$_2$, 25.6 g. NaOH, 165 ml. of water and 41.3 ml. of benzene are charged to a 300 ml. stainless steel pressure tube. After being cooled and evacuated, the tube is heated to 175° C. and pressured with hydrogen to 750 p.s.i. These conditions are maintained for 3 hours after which time the reaction mixture is recovered and analyzed by gas chromatography. Analysis of the crude organic product shows 24.5% hydrogenation products of which 76% is cyclohexene and 24% is cyclohexane.

Examples 32–38

In these examples the amounts of $RuCl_3 \cdot 3H_2O$, $TiCl_3$, water and benzene are as shown in Example 31. The amounts of other reactants, reaction conditions and product analyses are summarized in Table 10.

TABLE 10

[Hydrogenation with added cationic promoter and carbonyl complex—elevated temperature and pressure]

| Example | $W(CO)_6$ (g.) | $ZnCl_2$ (g.) | NaOH (g.) | Hydrogen pressure (p.s.i.) | Temperature (° C.) | Time (hrs.) | Product (percent) Conv. | Cyene |
|---|---|---|---|---|---|---|---|---|
| 32 | 0.36 | 2.27 | 25.6 | 750 | 175 | 3 | 50 | 65 |
| 33 | 1.24 | 1.6 | 25.6 | 1,500 | 225 | 3 | 59 | 24 |
| 34 | 1.24 | 1.6 | 25.6 | 3,000 | 175 | 3 | 11.3 | 75 |
| 35 | 1.24 | 3.2 | 25.6 | 750 | 175 | 3 | 4.6 | 88 |
| 36 | 1.24 | 1.6 | 25.6 | 750 | 175 | 1 | 9 | 81 |
| 37 | 0.36 | 2.26 | 12.80 | 750 | 175 | 8 | 37 | 66 |
| 38 | 0.36 | 2.26 | 51.3 | 750 | 175 | 3 | 41 | 67 |

Example 39

A catalyst on 4A molecular sieves is prepared as described in Example 41 (Section A).

Fifteen grams of the catalyst mixture, 3.72 g. $W(CO)_6$, 4.78 g. $ZnCl_2$, 76.9 g. NaOH in 496 ml. of water and 124 ml. benzene is charged under nitrogen to a laboratory reactor (Section B—Examples 5–6). After being thoroughly flushed with hydrogen the reaction mixture is heated to 55° C. and pressured with hydrogen to 48 p.s.i. These conditions are maintained for 22 hours after which time the organic layer is recovered and analyzed by gas chromatography. Analysis of the crude product shows 26.5% hydrogenation products of which 32% is cyclohexene and 68% is cyclohexane.

Example 40

A catalyst mixture, prepared as described in Example 39, containing 5.0 g. Ru-on-molecular sieves, 0.67 g. $W(CO)_6$, 1.6 g. $ZnCl_2$, 25.6 g. NaOH in 165 ml. of water and 41.3 ml. benzene are charged under nitrogen to a 330 ml. stainless steel pressure tube. After being cooled and evacuated, the tube is heated to 100° C. and pressured with hydrogen to 750 p.s.i. These conditions are maintained for 3 hours after which time the reaction mixture is recovered and analyzed by gas chromatography. Analysis of the crude organic product shows 2% hydrogenation products of which 81% is cyclohexene and 19% is cyclohexane.

Example 41

In a nitrogen purge 0.1 g. of ruthenium on $CaCO_3$, 0.05 g. of $ZnCl_2$, 0.05 g. of $W(CO)_6$, 0.8 ml. of 50% aqueous NaOH, 3 ml. of water and 2 ml. of benzene are charged to a 10 ml., stainless steel pressure tube coated with Teflon®. The tube is closed, cooled in Dry Ice, evacuated briefly, charged with hydrogen at 50 atmospheres and held at 175° C. for 5 hours. Gas chromatographic analysis shows that the crude organic layer recovered to contain 2.48% hydrogenation products of which 51% is cyclohexene and 49% is cyclohexane.

Example 42

Following the procedure of Example 41 a charge of 0.1 g. of ruthenium on 10X molecular sieve, 0.05 g. of $ZnCl_2$, 0.05 g. of $W(CO)_6$, 0.37 g. of LiOH, 3 ml. of water and 2 ml. of benzene shows 5.47% hydrogenation products of which 31% is cyclohexene and 69% is cyclohexane.

What is claimed is:

1. A process for converting a monocyclic aromatic compound to a cyclic monoolefin, the aromatic compound having the formula $C_6H_{6-n}A_n$ wherein A is at least one radical from the group consisting of hydrogen, halogen,

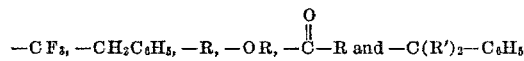

wherein R' is an alkyl group of one to four carbon atoms, R is of the group consisting of phenyl and alkyl groups having one to six carbon atoms and n is an integer of 1–3, which comprises partially hydrogenating the aromatic compound in a reactor under a hydrogen pressure in the range of about 0.1 to about 500 atmospheres and at a temperature in the range of about 0° C. to about 250° C., in the presence of water and an alkaline agent and a catalyst comprising at least one reduced cation of a Group VIII element.

2. The process of claim 1 wherein the water and the alkaline agent constitute an aqueous solution having a pH with numerical value greater than 7.5.

3. The process of claim 2 wherein the aqueous alkaline solution is a solution of an alkali metal hydroxide.

4. The process of claim 3 wherein the Group VIII element is of the group consisting of ruthenium, rhodium and palladium.

5. The process of claim 4 wherein the Group VIII element is ruthenium.

6. The process of claim 3 wherein the compound of the Group VIII metal is reduced with an agent of the group consisting of $TiCl_3$, $NaBH_4$, $CrCl_2$, $FeCl_2$, Li, Na, K, Rb, Ca, Sr, Ba, Th, Al, Mg, Zn and hydrogen.

7. The process of claim 6 wherein the reducing agent is of the group consisting of $TiCl_3$, $CrCl_2$, $NaBH_4$, zinc and hydrogen.

8. The process of claim 7 wherein the aromatic compound is of the group consisting of benzene, toluene and the xylenes.

9. The process of claim 5 wherein there is introduced into the reactor, in addition to the reduced cation of a Group VIII element, a cation of the group consisting of $Zn^{++}$, $Cr^{++}$, $Hg^+$, $Hg^{++}$, $Ni^{++}$, $Mo^{++}$, $Fe^{++}$, $Fe^{+++}$, $Co^{++}$ and $Cu^+$ in an amount from about 0.1 to about 1.0 mole percent, based on the molar amount of the reduced cation of Group VIII element.

10. The process of claim 5 wherein the hydrogenation is carried out in the added presence of a carbonyl of a metal of the group consisting of chromium, molybdenum and tungsten, in an amount from about 0.01 to about 1.0 mole percent based on the molar amount of the aromatic compound being hydrogenated.

11. The process of claim 9 wherein the hydrogenation is carried out in the added presence of a carbonyl of a metal of the group consisting of chromium, molybdenum and tungsten, in an amount from about 0.01 to about 1.0 mole percent based on the molar amount of the aromatic compound being hydrogenated.

12. The process of claim 9 wherein the aromatic compound is of the group consisting of benzene, toluene and the xylenes.

13. The process of claim 10 wherein the aromatic compound is of the group consisting of benzene, toluene and the xylenes.

14. The process of claim 11 wherein the aromatic compound is of the group consisting of benzene, toluene and the xylenes.

References Cited

UNITED STATES PATENTS

| | | | |
|---|---|---|---|
| 3,531,536 | 9/1970 | Gerhold | 260—667 |
| 3,183,278 | 5/1965 | Koch, Jr. | 260—667 |
| 2,846,488 | 8/1958 | Miller | 260—667 |
| 3,391,206 | 6/1968 | Hartog | 260—666 |
| 3,594,307 | 7/1971 | Kirk | 208—57 |

FOREIGN PATENTS

| | | | |
|---|---|---|---|
| 252,638 | 6/1964 | Australia | 260—667 |
| 711,742 | 6/1965 | Canada | 260—667 |

DELBERT E. GANTZ, Primary Examiner

J. M. NELSON, Assistant Examiner

U.S. Cl. X.R.

208—143

PO-1050
(5/69)

UNITED STATES PATENT OFFICE
CERTIFICATE OF CORRECTION

Patent No. 3,767,720          Dated Oct. 23, 1973

Inventor(s) William Charles Drinkard, Jr.

It is certified that error appears in the above-identified patent and that said Letters Patent are hereby corrected as shown below:

Column 20, line 58, "0.1" should be --0.01--.

Signed and sealed this 19th day of March 1974.

(SEAL)
Attest:

EDWARD M. FLETCHER, JR.         C. MARSHALL DANN
Attesting Officer             Commissioner of Patents